Dec. 5, 1944.  R. NIEWENDORP  2,364,308
HAY AND SHOCK LOADER
Filed Feb. 10, 1943  2 Sheets-Sheet 1

INVENTOR.
Richard Niewendorp
BY Sam J. Slotsky
ATTORNEY.

Dec. 5, 1944.  R. NIEWENDORP  2,364,308
HAY AND SHOCK LOADER
Filed Feb. 10, 1943  2 Sheets-Sheet 2
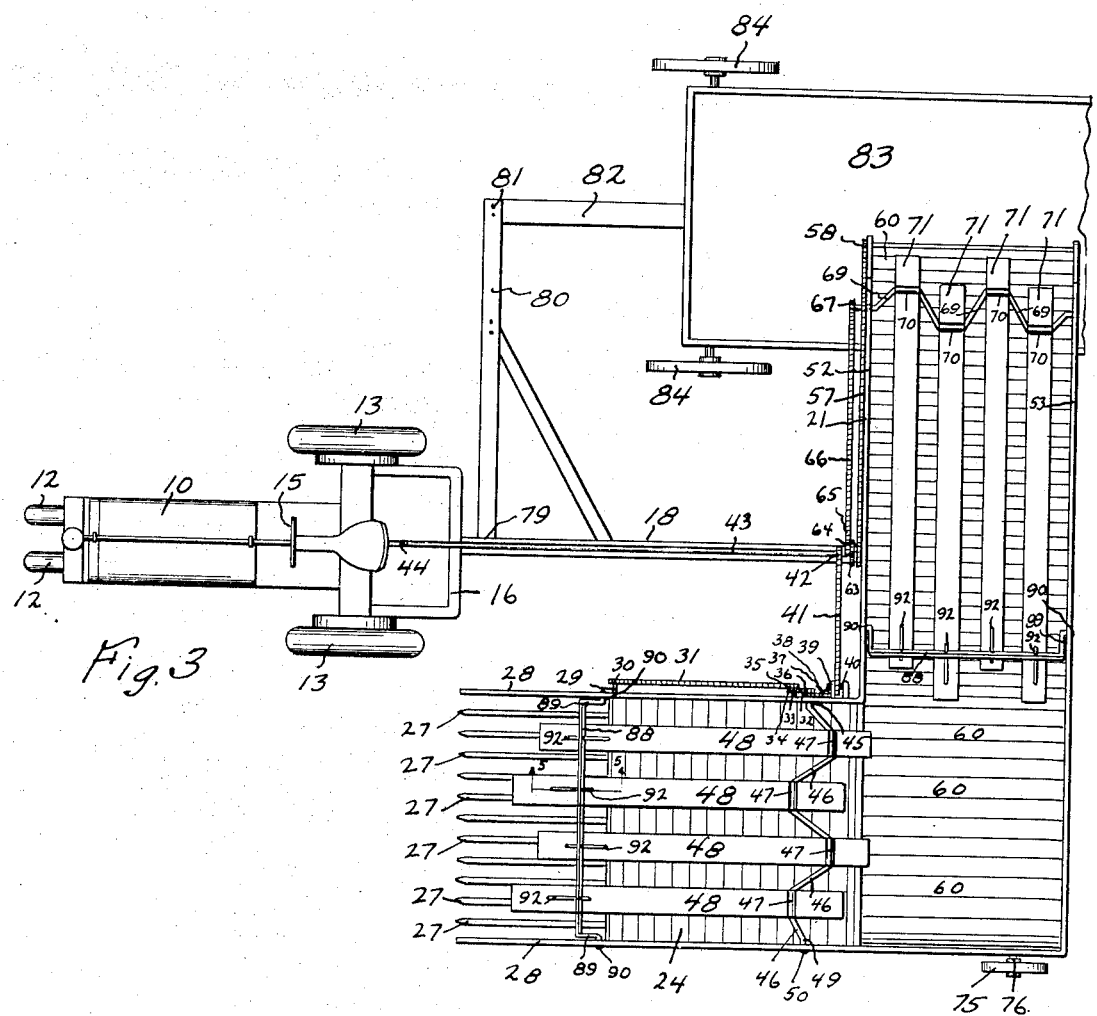
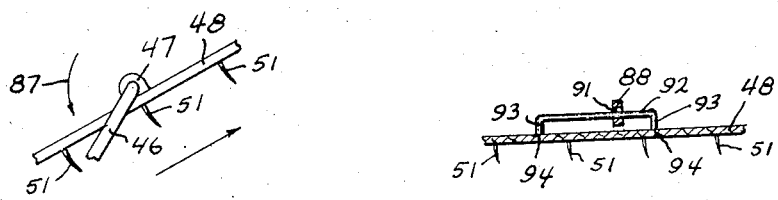
INVENTOR.
Richard Niewendorp
BY Sam J. Slotsky
ATTORNEY.

Patented Dec. 5, 1944

2,364,308

UNITED STATES PATENT OFFICE 2,364,308

HAY AND SHOCK LOADER

Richard Niewendorp, Sanborn, Iowa

Application February 10, 1943, Serial No. 475,457

2 Claims. (Cl. 214—83)

My invention relates to a hay and shock loader.

An object of my invention is to provide a loader of this type which will efficiently gather hay or shocks and transfer the same to a wagon.

A further object of my invention is to provide means for drawing the loader and the wagon simultaneously from a single unit such as a tractor.

A further object of my invention is to provide means for powering the loader from the tractor.

A further object of my invention is to provide means for insuring retention of the hay or shocks upon the elevating mechanism while the same is being elevated to the raised portion.

A further object of my invention is to provide means in combination with such retention means to assist the upward movement of such hay along the elevating means.

A further object of my invention is to provide the above mentioned objects in simple construction as possible consistent with the design of the same.

Figure 1:
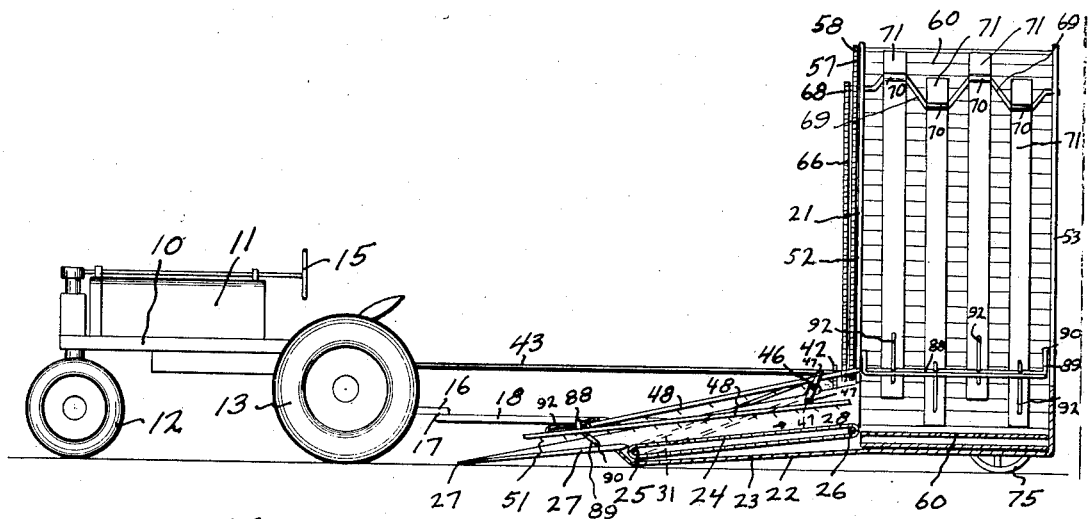
Figure 2:
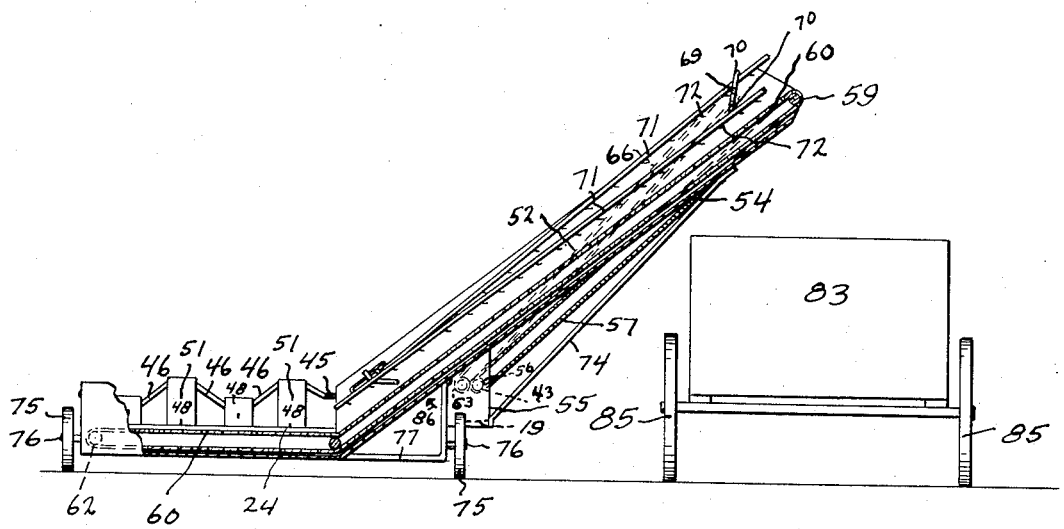

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 is a side elevation of the arrangement, a portion of the same being taken in section, Figure 2 is a rear view, Figure 3 is an upper plan view of the arrangement, Figure 4 is a detail, and Figure 5 is a further detail.

One of the primary purposes of my invention is to provide a power drawn arrangement which gathers the hay or shocks and elevates the same to a suitable carrying device such as a wagon and to perform this function with a minimum amount of labor.

I have used the character 10 to designate generally a tractor having the hood 11, the forward wheels 12 and the rear wheels 13, and the steering wheel 15. The tractor draw bar member is indicated by the character 16. Attached at 17 to the draw bar 16 is the rearwardly extending member 18 which passes rearwardly and is attached at 19 (see Figure 2) to the elevating member.

The elevating member comprises the forwardly extending housing 20 and the laterally extending housing 21 which housings are at right angles to each other. The housing 20 includes the bottom 22 and spaced slightly above the bottom 22 is the slatted member 23 which comprises a series of transversely extending slats 24 attached together and adapted to roll or rotate about the rollers 25 and 26. The rollers 25 and 26 are adapted to rotate in such a manner as to carry the hay and shocks upwardly along the inclined bottom 22.

A series of forwardly extending tines 27 are spaced at an equal distance apart between the sides 28 of the member 20. The roller 25 is attached to a shaft 29 which extends therethrough and which shaft is attached to a sprocket 30. Passing over the sprocket 30 is the chain drive 31 which passes over a further sprocket 32 which is attached to a gear 33. The gear 33 meshes with a further gear 34 which is attached to a sprocket 35 over which sprocket passes the chain drive 36 to a further sprocket 37. The sprocket 37 is attached to a bevel gear 38 which meshes with a further bevel gear 39 which is attached to the sprocket 40 which is driven by means of the chain 41 which in turn is driven by means of the sprocket 42 which is attached rigidly to the drive shaft 43 which shaft 43 passes into the power takeoff of the tractor as shown clearly in Figure 3.

A universal joint can be provided at 44. Attached to the sprocket 35 is the shaft 45 which extends into the eccentric arm 46 which terminates into transverse bearing portions received within suitable bearings 47. The bearings 47 are rigidly attached to the longitudinal impelling members 48. It will be noted that two of the impelling members 48 are positioned forwardly of the central shaft 45 and two are positioned rearwardly. The other end of the arrangement terminates in the shaft portion 49 which passes through a suitable bearing at 40 in the side 28. Attached to the lower side of the member 48 are the upwardly inclined tines 51 which are slightly curved upwardly, the reason for which will be presently explained.

The transverse member 21 includes the sides 52 and 53 and the bottom 54 (see Figure 2). Extending downwardly from the bottom 54 is the solid member 55 to which the aforesaid bar 18 is attached at 19. Suitably attached at the shaft 43 at 55 is the sprocket 56 over which passes the chain drive 57 which passes upwardly and over a further sprocket 58 which is attached to the roller 59. Passing over the roller 59 is another series of slats such as 60 which pass over the lower roller 61 and a further roller 62. The space between the roller 61 and 62 is horizontal and the inclination starts at the roller 61. Attached to the shaft 43 adjacent to the sprocket 56 is the gear 63 which meshes with a further gear 64 which is in turn attached to a sprocket 65 over which passes the chain drive 66 which passes over a further sprocket 67 and which sprocket is attached to the shaft 68.

The shaft 68 extends into the eccentrically positioned arms 69 which in all respects are similar to the eccentric arms 46. The arms 69 terminate in the horizontal bearing portion 60 which receives suitable bearing portions therein. The bearing 70 is attached to further impelling members 61. Attached to the impelling members 71 are a further series of pointed tines 72 similar to the members 51. Attached between the bottom 54 and the bracing member 55 is the further brace 74. A pair of wheels 75 are suitably journalled at 76 upon axles, one of which is attached to a further brace member 77. As explained, the member 18 can be attached to the brace member 55 to pull the unit.

Extending parallel to the usual draw bar 16 and attached to the member 18 at 79 is the transversely extending bar 80 which is pivoted or attached at 81 to the wagon tongue 82 which is suitably attached to the wagon 83. The wagon 83 is mounted upon wheels 84 and 85 in the usual manner. Now that the structure of my device has been explained, I shall explain the operation thereof.

It will be noted that the entire arrangement is pulled by means of the tractor 10 which besides pulling the elevating mechanism also pulls the wagon 83 for receiving the hay or shocks. At the same time, through the power takeoff shaft 43, the entire mechanism is driven. It will be seen from the foregoing gear arrangement that as the power takeoff shaft rotates in the direction of the arrow 86, the slats 60 through the same drive will be rotated in a similar direction thereby tending to carry the hay upwardly along the inclined member 21. Also through the chain drive 41 and through the gearing arrangement as described, the slats 23 will also move upwardly over the rollers 25 and 26, since the action is reversed at the gears 33 and 34.

It will be noted, however, that through the foregoing arrangement that the direction of rotation of the shafts 45 and 68 are in the direction of the arrow 87 (see Figure 4) which tends to correspondingly rotate the impellers 48 and 71 in a direction upwardly or in the direction the hay is being carried along the slatted members. As a result, the points 51 and 72 which are inclined forwardly tend to assist the hay or shocks in rising toward the respective inclines thereby insuring a positive delivery of the material upwardly and toward the extreme top of the incline member 21. It will be understood that the eccentric action of the impelling members 71 and 48 causes the respective impeller to come downwardly against the mass of hay, etc., and in continuing the rotation thereof to force the same upwardly and since the points will penetrate into the material the action is made positive so that the material will be held against the slats and at the same time will be impelled upwardly.

It is not necessary to have the impellers along the horizontal portion where the slats 60 pass over the rollers 61 and 62 and such impellers are only necessary on the inclined portions of the device.

It will be seen through the foregoing gear arrangement that the direction of rotation of the shafts 66 and 45 are reversed to that of the rollers 59, 61, 62, 25 and 26 since this is necessary to insure that the impellers travel upwardly since the impellers rotate above the slatted conveying members. It will thus be seen from the foregoing construction that as the tractor is driven the spaced tines 27 through the forward motion of the same will force the material upwardly on to the first smaller incline of slats, thence to the horizontal portion and thence to the inclined slats in the member 21 and by the assistance of the impellers with the points thereon, the hay or other material is carried upwardly to the top of the arrangement and then dropped by gravity into the wagon 83.

It is necessary to maintain the lower ends of the impelling blades 48 and 71 in a substantially level position with respect to each other and at the same time to allow for the passage of the different thicknesses of hay or other material thereunder. To provide this result, I provide the horizontal members 88 which are bent into the angularly inclined portions 89 which in turn are journalled at 90 in the sides of the conveyors. The members 88 include the enlarged openings 91 therein in which are received the further members 92 which are bent downwardly into the portions 93 which are attached at 94 to the impellers 48 and 71.

It will be noted from Figure 1 especially that the arms 89 in being angularly inclined permit a certain amount of vertical movement of the lower ends of the blades 48 and 71. This permits a variation in the passage of material upwardly along the slatted arrangements so that any thickness can be accommodated either in bunches or otherwise and this member also provides a support for the lower ends of the impellers.

It will be noted that the opening 91 in being considerably larger than the diameter of the rod 92 permits considerable angular variation between successive impeller members so that regardless of the angle all of the impellers can be supporting one transverse bar 88.

It will be noted that the tines 27 are positioned slightly above the slats 23 and that the slatted members 23 are positioned slightly above the horizontal portion of slats between the rollers 61 and 62. This is to insure that the material drops on to the succeeding conveyers with the greatest efficiency. It will also be noted that the bottom 22 extends into the portion 88 to protect the tines and the portions adjacent the roller 21.

It will now be seen that I have provided a hay and shock loader which efficiently gathers hay and delivers the same to a wagon, which provides means for drawing the loader and wagon simultaneously, which provides impelling means for forcing the hay upwardly and holding the same as it is conveyed upwardly, and which can be powered from a tractor.

Some changes may be made in the construction and arrangement of the parts of my invention without departing from the real spirit and purpose of my invention, and it is my intention to cover by my claims any modified forms of structure or use of mechanical equivalents, which may be reasonably included within their scope.

I claim as my invention:

1. A hay and shock loader comprising a forward gathering member including a plurality of spaced tines, a slatted conveying member communicating with said tines, a transverse conveying member communicating therewith, said transverse conveying member including spaced rollers, slatted conveyors mounted upon said rollers, impelling members positioned above said gathering and conveying members adapted to impel material upwardly, said impelling members including a plurality of spaced flat blades, said blades including a series of pointed members attached thereto, eccentric arms attached to said impeller blades, shafts for rotating said arms to cause said blades to rotate eccentrically from a higher upward position to a lower position and in a direction upwardly of said gathering and said conveying members.

2. A hay and shock loader comprising a forward gathering member including a plurality of spaced tines, a slatted conveying member communicating with said tines, a transverse conveying member communicating therewith, said transverse conveying member including spaced rollers, slatted conveyors mounted upon said rollers, impelling members positioned above said gathering and conveying members adapted to impel material upwardly, said impelling members including a plurality of spaced flat blades, said blades including a series of pointed members attached thereto, eccentric arms attached to said impeller blades, shafts for rotating said arms to cause said blades to rotate eccentrically from a higher upward position to a lower position and in a direction upwardly of said gathering and said conveying members, means for attaching said loader to a tractor, means for attaching a hay receiving wagon to said tractor to be drawn simultaneously therewith, said wagon being positioned beneath the highest portion of said loader.

RICHARD NIEWENDORP.